Feb. 8, 1966     D. H. GRUGEL     3,233,425
FREEZING APPARATUS

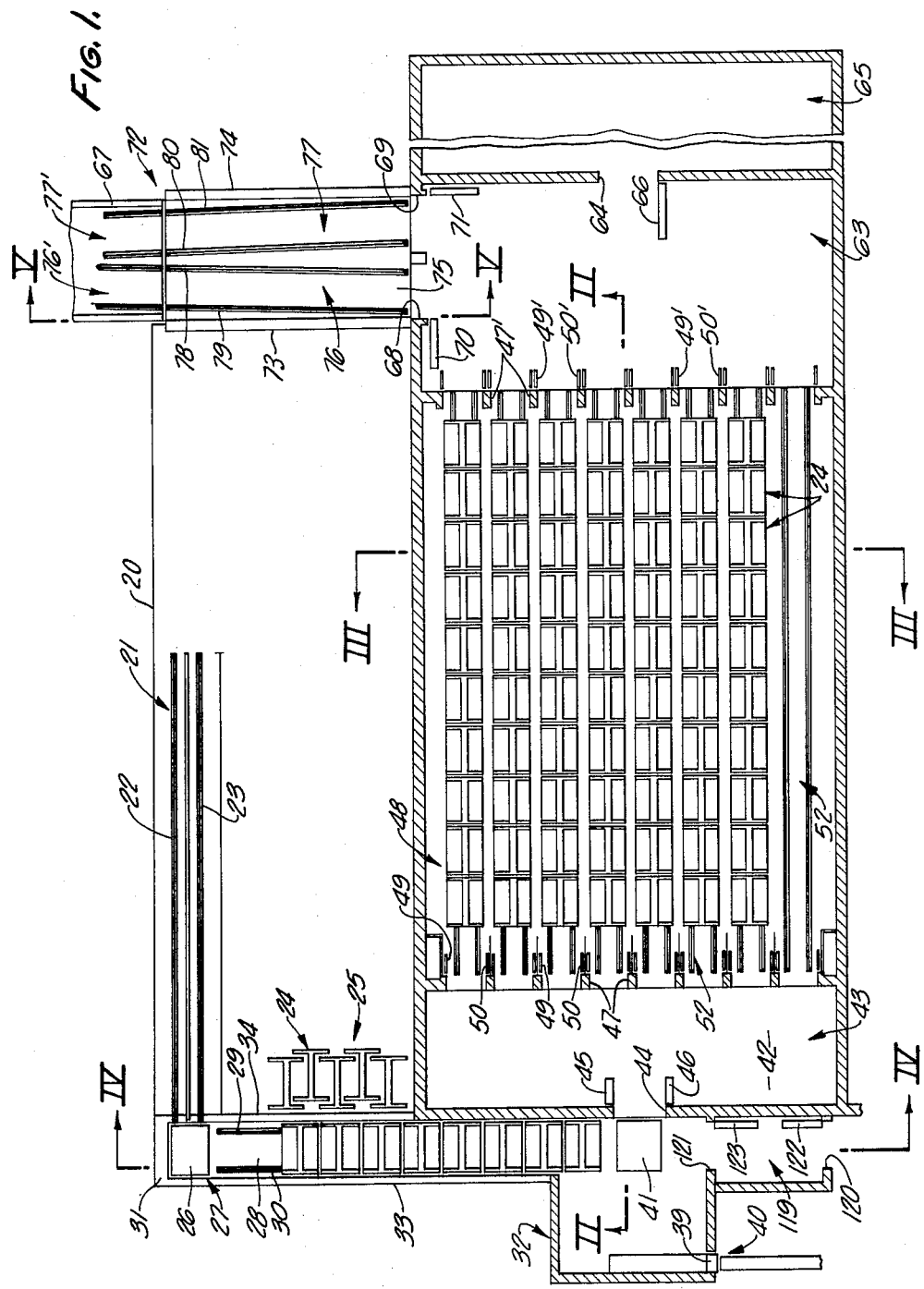

Filed May 14, 1963     4 Sheets—Sheet 2

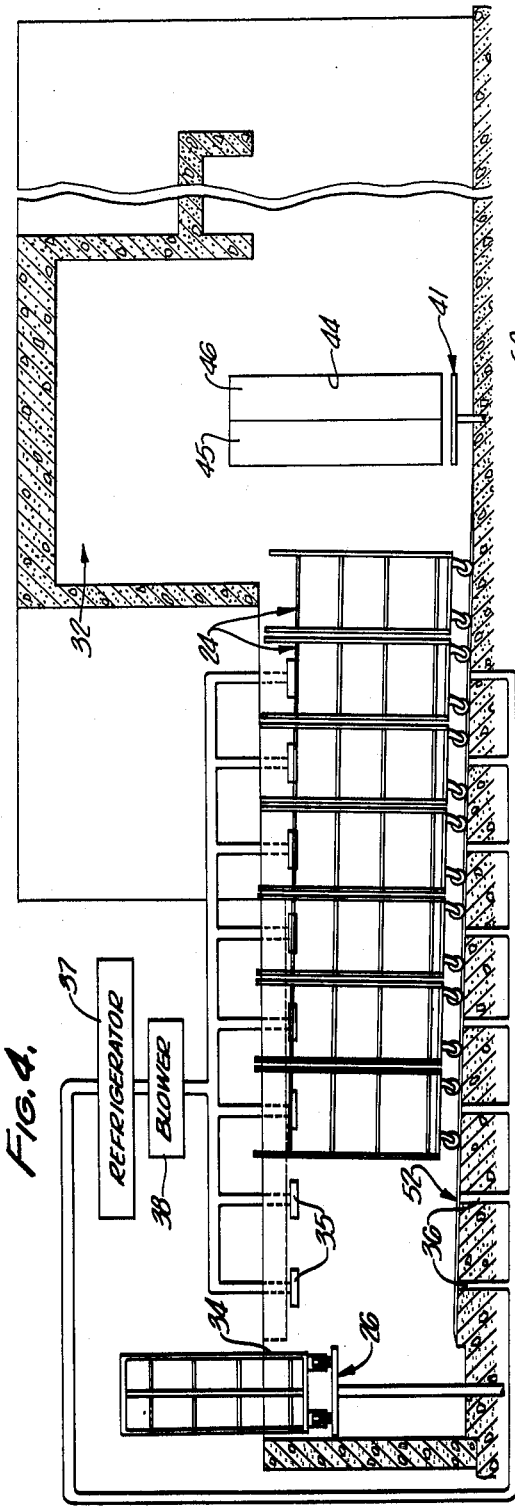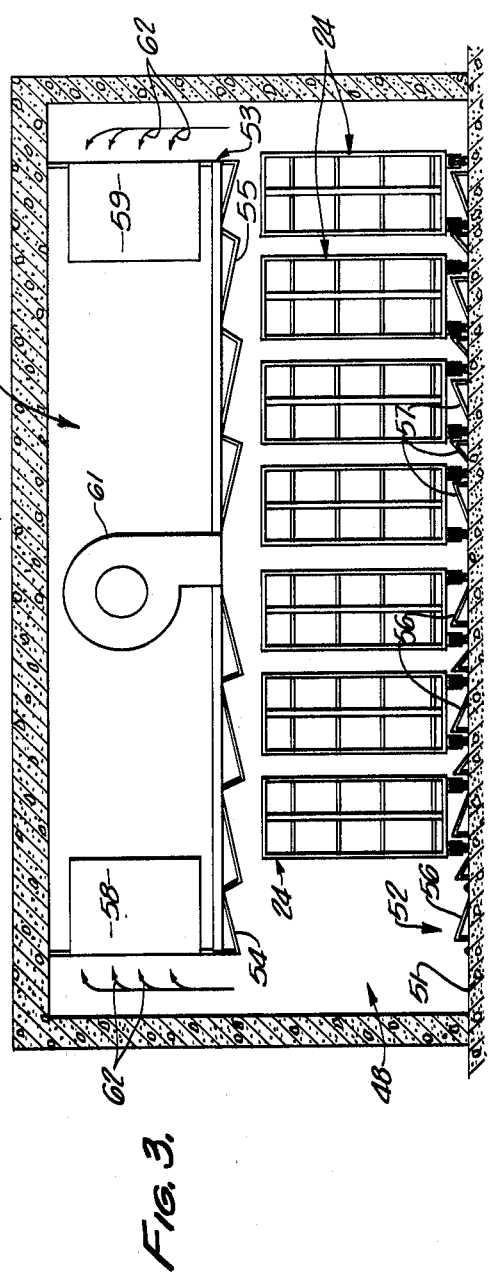

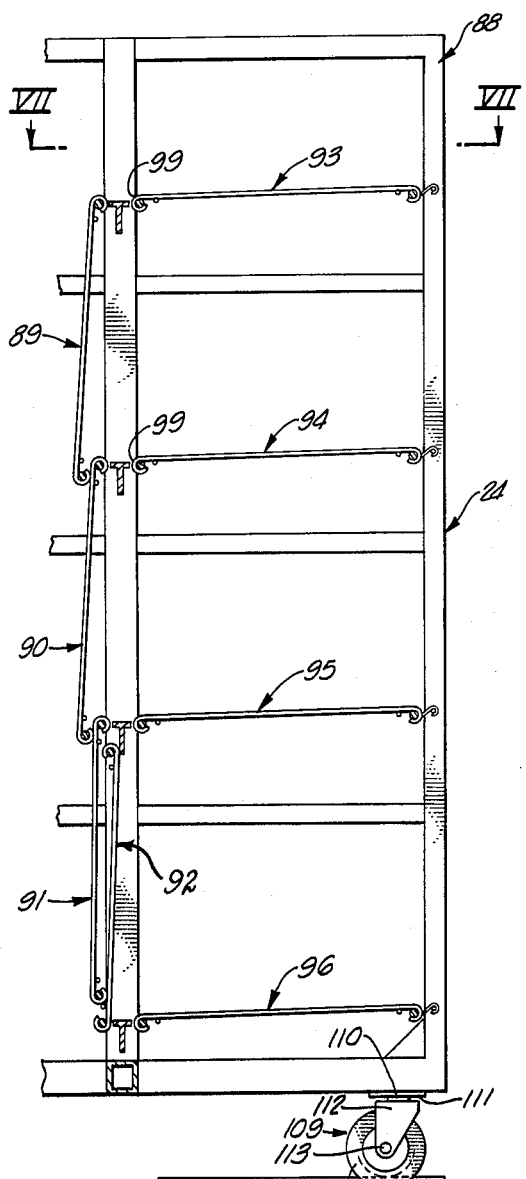
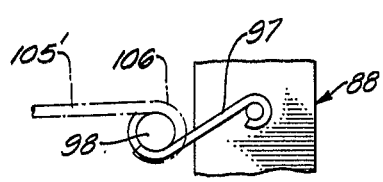
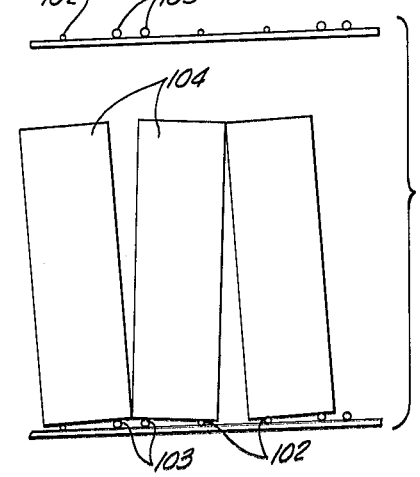
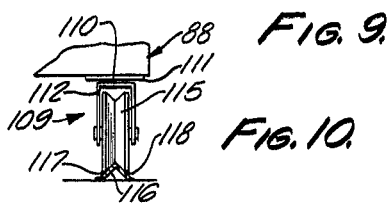

United States Patent Office 3,233,425
Patented Feb. 8, 1966

3,233,425
FREEZING APPARATUS
Donald H. Grugel, 2807 E. Mesa Drive,
West Covina, Calif.
Filed May 14, 1963, Ser. No. 280,266
5 Claims. (Cl. 62—382)

This invention relates to the art of rapidly freezing ice cream until it is hard, and more particularly to trouble-free freezing equipment which may be operated economically.

In the prior art, it has been the practice to load paperboard cartons with ice cream at an ice cream temperature of about +20 degrees Fahrenheit. Several of these cartons are then overwrapped together and placed in a freezing room at a temperature of about −20 degrees Fahrenheit. In such a case, manual labor is required to pack the overwraps in a freezing room. The unusually low temperature of this room makes it impossible for a person to work in it more than one-half of the time. The cost of such packing is thus double that of packing in a room kept at a comfortable temperature. Persons who work in freezing rooms are called "Eskimos."

A recent development in the ice cream freezing art has been the use of an electric motor driven conveyor system for a freezing room to obviate the need for employing "Eskimos." However, electric motors do not operate reliably at freezing room temperatures.

A further disadvantage of prior art freezing plants has been the build-up of ice in areas surrounding freezing room entrances and exits. Prior art freezing plants also fail to freeze ice cream rapidly.

Solutions to these prior art problems are provided by the apparatus of the present invention which includes a cooling room, a freezing room, and a dispatch room. The cooling room is connected with the freezing room by a series of doors. The freezing room is connected with the dispatch room by another set of doors.

In accordance with the apparatus of the present invention, overwrapped ice cream cartons are placed upon carts. These carts are then pushed through the cooling room through two freezing room doors. The floor of the freezing room is inclined. The carts therefore roll to the position of the freezing room to dispatch room doors.

From the foregoing, it will be appreciated that the need for employing "Eskimos" in the freezing room is obviated in that the movement by gravity of the carts on the inclined floor of the freezing room makes it unnecessary for these carts to be moved by an electric motor or manually. For this same reason, the carts may have a simple mechanical construction which will operate easily at very low freezing room temperatures.

The use of the cooling room and dispatch room adjacent the freezing room keeps the build-up of ice in an area surrounding the freezing room doors to a minimum.

Baffles are employed in the freezing room of the present invention to facilitate rapid ice cream freezing by a rapid flow of refrigerated air.

In accordance with a feature of the present invention, the ice cream carts are transported to the cooling room via a well, which for efficient transportation, is maintained open to the atmosphere at all times. This well is cooled by a unique air convection system.

In accordance with the apparatus of the present invention, throughout an ice freezing plant, means are provided to manipulate the carts efficiently. A truck loading hoist is, in particular, provided for this purpose. Further, the carts themselves are specially constructed to be employed in an ice freezing plant constructed in accordance with the present invention. The carts are constructed to collapse and to nest so that they may be stored in a minimum amount of space. Further, they are constructed so that overwrapped ice cream cartons may be spaced apart. In this case, freezing air may be circulated between the overwraps. This makes it possible to freeze the ice cream in the cartons of the overwraps more rapidly than it would be possible to do if the overwraps were stacked tightly together.

The above-described and other advantages of the present invention will be better understood from the following description when considered in connection with the accompanying drawings.

In the drawings which are to be regarded as merely illustrative:

FIG. 1 is a top plan view partly in section of an ice cream freezing plant constructed in accordance with the present invention;

FIG. 3 is a transverse sectional view of the plant taken on the line III—III shown in FIG. 1;

FIG. 4 is a second transverse sectional view of a cart well taken on the line IV—IV shown in FIG. 1;

FIG. 6 is a side elevational view of an ice cream cart partly broken away and partly in section;

FIG. 7 is a transverse sectional view of the cart taken on the line VII—VII shown in FIG. 6;

FIG. 8 is an enlarged view of a hook arrangement which which is employed in accordance with the present invention to hold a cart shelf in place;

FIG. 9 is an enlarged view of the cart turned 90 degrees, but similar to that shown in FIG. 6; and FIG. 10 is a front elevational view of a cart wheel and cart wheel track rail which is employed in accordance with the present invention.

Figure 5:
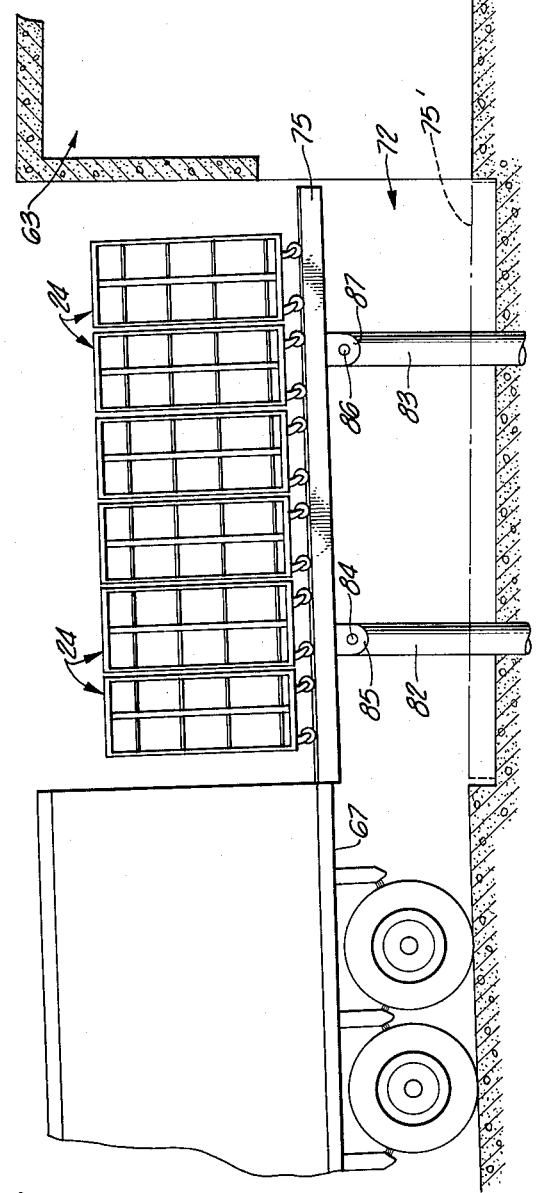
FIG. 5 is a transverse sectional view of a portion of a hoist taken on the line V—V shown in FIG. 1.

In the drawing in FIG. 1, an ice cream freezing plant is shown including an unloading dock 20 on top of which a track 21 is positioned having rails 22 and 23 upon which carts indicated at 24 ride. Carts 24 are stored in a collapsed and nested position as indicated at 25 in FIG. 1 until they are needed. They are then rolled to the position of a conventional dumb-waiter 26 in a well 27 at which point the carts 24 are lowered into well 27.

Well 27 is provided with a floor 28 which is inclined downwardly as viewed in FIG. 1. Inclined floor 28 is provided with a pair of rails 29 and 30 on which carts 24 ride. Floor 28 is inclined as indicated in FIG. 4. Well 27 is provided with an end wall 31 which is closed. The opposite end of well 27 is open into a loading room 32. Well 27 is provided with side walls at 33 and 34. Both side walls 33 and 34 are provided with elongated slots at 35 through which cold air is blown.

Slots are provided in inclined floor 28 at 36. Air is withdrawn from the space inside well 27 through slots 36 by a blower 38. This air which is withdrawn is refrigerated by a refrigerator 37 and blown through slots 35.

Figure 2:
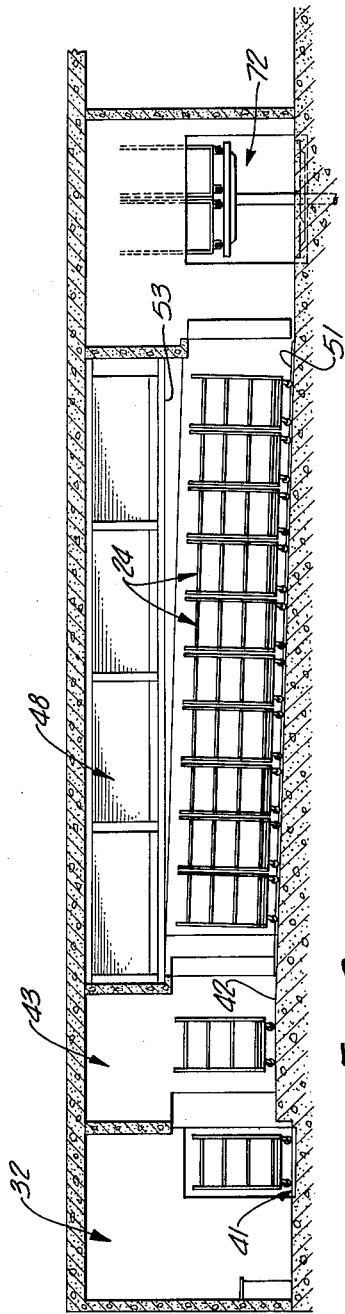
FIG. 2 is a longitudinal sectional view of the plant taken on the line II—II shown in FIG. 1.

Loading room 32 is provided with an opening at 39 through which a conveyor system 40 extends. Conveyor system 40 transports overwrapped cartons full of ice cream from a position outside of loading room 32 to a position inside of it. Empty carts 24 are then loaded with the overwrapped ice cream cartons in loading room 32. A conventional hoist, as shown at 41 in FIGS. 2 and 4, is then employed to raise a loaded cart 24 to the level of a floor 42 of a cooling room 43.

A doorway is provided between loading room 32 and cooling room 43 at 44. A pair of swinging doors 45 and 46 are employed to close doorway 44. Swinging doors 45 and 46 are conventional and are biased to swing to the closed position shown in FIG. 4.

Similarly, a plurality of doorways 47 are provided from cooling room 43 to a freezing room 48 which are closed with swinging doors at 49 and 50 all of which are conventional and biased to a normally closed position similar to the closed position of doors 45 and 46 as shown in FIG. 4. Doors 49 and 50 are not shown in their closed positions in FIG. 1 for clarity.

Freezing room 48 is provided with an inclined floor 51 on which tracks 52 are provided identical to track 21. A cooling system is provided for ice cream on carts 24 in freezing room 48 as illustrated in FIG. 3, including a suspended ceiling 53 having baffles 54 and 55 connected therefrom. Baffles at 56 and 57 are also provided on floor 51 or freezing room 48.

Baffles 54, 55, 56 and 57 are employed to bring circulated air close to carts 24. For example, note will be taken that the upper edges of baffles 56 lie in vertical alignment with the lower portions of baffles 54. The restriction thus provided makes it possible to circulate air around carts 24 at a high velocity for an efficient heat exchange between the air and ice cream on carts 24. Rapid freezing may thus be effected.

Air is drawn through refrigeration units at 58 and 59 into a chamber 60 above ceiling 53 and blown through a central portion of ceiling 53 by a centrifugal blower 61. Air is therefore circulated as indicated by arrows 62 in FIG. 3. A series of doorways 47' are provided between freezing room 48 and dispatch room 63 identical to doorways 47. Swinging doors 49' and 50' are provided to close doorways 47'. Doors 49' and 50' are respectively identical to doors 49 and 50. A doorway 64 is provided between dispatch room 63 and a storage room 65. A door 66 is provided to close doorway 64.

Frozen ice cream may be shipped by truck as indicated at 67 in FIG. 5 through doorways 68 and 69 in dispatch room 63. Doorways 68 and 69, respectively, may be closed by doors 70 and 71. A hoist is provided at 72 having fixed side walls 73 and 74 and a platform 75. Platform 75 has tracks 76 and 77 thereon identical to track 21. Track 76 has rails 78 and 79. Track 77 has rails 80 and 81.

Platform 75 is moved in a vertical direction by piston rods 82 and 83 which are connected to conventional hydraulic rams not shown. The upper end of piston rod 82 is pinned at 84 to a clevis 85 fixed with platform 75. In its lower position, platform 75 rests horizontal as indicated at 75'. In its upper position, it is slightly inclined as indicated in solid lines in FIG. 5.

Although in accordance with several features of the present invention, any conventional ice cream cart may be employed, it is a feature of the present invention that a special ice cream cart be employed as shown in FIGS. 6 to 10 inclusive.

As shown in FIG. 1, carts 24 on unloading dock 20, in plan, may have a generally H shape when the same are collapsed and nested. This H shape is the shape in top plan of a framework as indicated at 88 in FIG. 6. A major portion of the left half of the cart shown in FIG. 6 has been broken away because the same is identical to the right half as indicated in FIG. 6. The cart has eight shelves indicated at 89, 90, 91, 92, 93, 94, 95 and 96. Hooks 97 are provided at each end of each shelf and are pivoted from framework 88 to hook under a rod 98 of each shelf to maintain the same in a horizontal position as shown in FIGS. 6, 7 and 8. Each shelf is provided with a hinge hook 99 so that each shelf may rotate vertically. Shelves 89, 90, 91 and 96 rotate to the left as viewed in FIG. 6. Shelves 93, 94, 95 and 92 rotate to the right as viewed in FIG. 6. Note will be taken that lower shelves 92 and 96 rotate in directions opposite to the shelves above them.

Four rods 105 are provided having a hook as indicated at 106 in FIG. 8 fixed to rod 98. Rod 105 is indicated in dotted lines at 105' in FIG. 8. Hinge hook 99 surrounds a small section of a rod 107 that is welded across a notch 108 in framework 88. Hence, hinge hook 99 extends over the top of rod 107 through the space in notch 108 between framework 88 and rod 107, and under rod 107. This construction is shown in all FIGS. 6, 7 and 9.

Although they cannot be seen in FIG. 6, a plurality of rods 102 and 103 parallel to rods 105 are provided on top of edge rods 100 as shown in FIGS. 7 and 9. Note will be taken that rods 102 are smaller in diameter than rods 103. It is thus possible to tilt overwrapped ice cream cartons as indicated at 104 in FIG. 9.

Each cart 24 is provided with a castering type wheel 109 at each of the four corners thereof as indicated in FIGS. 6 and 10. A shaft 110 is projected through a ferrule 111 as is conventional. Shaft 110 has a clevis 112 fixed thereto. Clevis 112 carries a wheel axle 113 about which a wheel 114 is rotatable. Note will be taken from FIG. 10 that wheel 114 is provided with a V-shaped circumferential groove 115 to fit the upper edge of a V-shaped rail 116. All the rails of all the tracks shown in FIG. 1 may be identical in cross section to the cross section of rail 116 as shown in FIG. 10. Note will be taken that tracks are disclosed at 21, 52, 76 and 77 in FIG. 1. In addition, a track including rails 29 and 30 is illustrated at the bottom of well 27. By the use of wheels of the type of wheel 114 having flat surfaces at 117 and 118, it is possible to manipulate carts 24 easily on both flat surfaces and on tracks including rails of the type indicated at 116 in FIG. 10.

An entry room 119 is provided with an outside doorway 120 and an inside doorway 121 as shown in FIG. 1. Entry room 119 is also provided with doors 122 and 123 to doorways 120 and 121 respectively. Entry room 119 is provided to prevent loading room 32 from icing, as much as it is possible to do so.

In accordance with the present invention, empty ice cream trucks carrying empty carts 24 will unload at dock 20. Unused empty carts 24 will then be collapsed and nested as at 25 in FIG. 1. If empty carts are needed, the same are supplied to dumb-waiter 26 via track 21. Empty carts 24 enter loading room 32 via the track including rails 29 and 30, rails 29 and 30 resting on inclined floor 28 of well 27.

Overwrapped ice cream cartons are supplied to loading room 32 by conveyor system 40. These overwrapped cartons filled with ice cream are often loaded onto carts 24 in the positions as indicated at 104 in FIG. 9. A loaded cart 24 is then raised to the position of floor 42 of cooling room 43 by hoist 41. The loaded cart is pushed off of hoist 41 onto cooling room floor 42 through doors 45 and 46.

The loaded cart 24 is then pushed through one of the doorways 47 through doors 49 and 50. The loaded cart 24 rides down one of the tracks 52 to the position of one of the doors 49' and 50'. As stated previously, doors 49' and 50' may be biased shut. The bias on these doors may be a spring bias or the doors may have a conventional cam operated gravity centering hinge. In either case, the bias of doors 49' and 50' to their closed positions is sufficient to hold back a complete load of carts 24 extending from doorway 47 to an opposite doorway 47' and to keep the same from entering dispatch room 63.

As is evident, a loaded cart 24 pushed through a doorway 47 will coast downhill on a track 52 on the inclined floor 51 of freezing room 48 until the same engages a pair of doors 49' and 50' or until the same engages the rear end of another cart 24.

After the ice cream in the overwrapped cartons has been frozen solid in freezing room 48, carts 24 are removed from freezing room 48 by pulling the same through doors 47' to dispatch room 63. To this point, carts are transferred through doorway 64 into storage room 65 or onto a truck 67. The floor of dispatch room 63 generally will be at ground level. Loaded carts 24 may therefore also be rolled directly onto hoist 72 and raised to the position shown in FIG. 5. Platform 75 may be tilted as shown in FIG. 5 and carts 24, by force of gravity, will roll into truck 67. Truck 67 may have tracks 76' and 77' to mate with track 76 and track 77. Tracks 76' and 77' may thus be identical to tracks 76 and 77. Tracks 76' and 77' are shown in FIG. 1.

From the foregoing, it will be appreciated that the need for "Eskimos" is obviated in that movement of cart 24 in freezing room 48 is entirely gravity controlled. Further, the use of the simple tracks 52 and wheels 114 make it possible to use carts 24 both on the flat surface of cooling room floor 42 and that of the dispatch room 63. The castering wheels 114 may also be employed to guide carts 24 on tracks 52 in cooling room 48. The use of entry room 119, well 27 with its refrigeration system 37 and 38, loading room 32, cooling room 43, and dispatch room 63, make it possible to freeze ice cream solid in a relatively short time within a relatively cold freezing room 48 and still maintain all the rooms shown in FIG. 1 relatively ice free.

In accordance with a special feature of the present invention, hoist 72 is provided to move loaded carts 24 automatically. The collapsible and nestable character of carts 24 make them easier to store as at 25 in FIG. 1. Further, the character of the different sizes of rods 102 and 103 make it possible to space overwrapped ice cream cartons 104 in a manner that the same may be rapidly cooled.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. An ice cream freezing plant comprising: an empty cart well having closed sides, means defining a closed bottom and end, and an open top; means defining a loading room adjacent an open end of said well, said loading room having a doorway at the position of said well open end, the bottom of said well being inclined towards said loading room doorway; means to withdraw air from said well at the bottom thereof; means to cool said air withdrawn from the bottom of said well; means to establish streams of said cooled air over the top of said well from the sides thereof; a plurality of empty carts movable by gravity in said well toward said loading room; an opening into said loading room; a conveyor to carry ice cream packages through said opening into said loading room; a cooling room adjacent said loading room; a doorway from said loading room to said cooling room; a freezing room adjacent said cooling room; a plurality of doorways connecting said cooling room with one end of said freezing room; a pair of swinging doors for each of said doorways connecting said cooling and freezing rooms; a dispatch room adjacent said freezing room; a plurality of doorways connecting the other end of said freezing room with said dispatch room; a pair of swinging doors for each said doorway at said other end of said freezing room; a storage room; a shipping door in said dispatch room; a doorway between said dispatch and storage rooms; said freezing room having a floor sloping from said one end thereof to said other end thereof; said carts having antifriction means on the bottoms thereof to move from said one end to the said other end of said freezing room; and means to guide movement by force of gravity of said carts in said freezing room from one of said pairs of swinging doors at said one end thereof to a corresponding pair of swinging doors at said other end thereof.

2. A cart entrance for an ice cream freezing plant comprising: means defining a well having one end wall, two side walls, and a floor, the other end of said well being open; means defining a freezing room; means defining at least one intermediate room between said well and said freezing room; an open doorway between the said other end of said well and said intermediate room; door means between said intermediate room and said freezing room; means to withdraw air from said well through the floor thereof; means to cool said withdrawn air; and means to establish streams of said cooled air in a position over said well emanating from the side walls thereof.

3. A cart entrance for an ice cream freezing plant comprising: means defining a well having a floor, said floor sloping from one end to the other end thereof; a cart in said well, said cart having antifriction means on the bottom thereof; means to withdraw air from said well through the floor thereof; means to cool said withdrawn air; and means to establish streams of said cooled air in a position over said well emanating from the sides thereof.

4. A cart entrance for an ice cream freezing plant comprising: means defining a well having a floor, said floor sloping from one end to the other end thereof; a cart in said well, said cart having antifriction means on the bottom thereof; means to guide movement of said cart down said slope; means to withdraw air from said well through the floor thereof; means to cool said withdrawn air; and means to establish streams of said cooled air in a position over said well emanating from the sides thereof.

5. An ice cream freezing plant comprising: means defining a freezing room having a floor and a ceiling; a row of carts on each side of the center of said room; means to circulate refrigerated air downwardly through the center of said ceiling and upwardly on the outside of said rows; a plurality of baffles hanging from said ceiling and inclined across each row of carts downwardly from the ceiling in the direction of the flow of said air; and baffles inclined upwardly from said floor in the direction of said air flow between the wheels of each cart and between said rows.

References Cited by the Examiner

UNITED STATES PATENTS

| | | | |
|---|---|---|---|
| 2,237,257 | 4/1941 | Finnegan | 62—382 X |
| 2,309,435 | 1/1943 | Bitney | 211—133 |
| 2,361,290 | 10/1944 | Herold | 188—41 |
| 2,421,439 | 6/1947 | Smith | 62—382 |
| 2,474,069 | 6/1949 | Silvera | 62—382 |
| 2,792,133 | 5/1957 | Warner | 214—38.46 |
| 2,874,858 | 2/1959 | Eden | 214—38.44 |
| 2,936,899 | 5/1960 | Tashman | 211—71 |

EDWARD J. MICHAEL, *Primary Examiner.*